United States Patent [19]
Simon et al.

[11] Patent Number: 6,065,008
[45] Date of Patent: May 16, 2000

[54] SYSTEM AND METHOD FOR SECURE FONT SUBSET DISTRIBUTION

[75] Inventors: Daniel R. Simon; Josh Benaloh; Donald D. Chinn, all of Redmond; Gregory Hitchcock, Woodinville; David Meltzer, Seattle, all of Wash.

[73] Assignee: Microsoft Corporation, Redmond, Wash.

[21] Appl. No.: 08/942,036

[22] Filed: Oct. 1, 1997

[51] Int. Cl.$^7$ .................................................. G06F 17/30
[52] U.S. Cl. ................ 707/10; 707/9; 707/529; 707/542; 345/467; 380/3; 380/4
[58] Field of Search ................... 707/542, 908, 707/10, 1, 9, 529; 345/467; 380/3, 4

[56] References Cited

U.S. PATENT DOCUMENTS

| | | | |
|---|---|---|---|
| 5,528,742 | 6/1996 | Moore et al. | 707/542 |
| 5,737,599 | 4/1998 | Rowe et al. | 707/104 |
| 5,859,648 | 1/1999 | Moore et al. | 345/471 |
| 5,877,776 | 3/1999 | Beaman et al. | 345/472 |
| 5,893,915 | 4/1999 | Cordell et al. | 707/513 |
| 5,940,581 | 8/1999 | Lipton | 358/1.11 |
| 5,990,907 | 11/1999 | Colletti | 345/467 |

*Primary Examiner*—Anton W. Fetting
*Assistant Examiner*—Greta L. Robinson
*Attorney, Agent, or Firm*—Lee & Hayes, PLLC

[57] ABSTRACT

This invention concerns a system and method for securely distributing subsetted fonts from a distributor to a client. The system includes a signing module to construct an authentication tree having leaves formed of glyphs, one or more intermediate levels of nodes computed as one-way functions of the glyphs, and a root computed as a one-way function of the nodes. The signing module digitally signs the root of the authentication tree using a private signing key unique to the font creator or distributor. The system has a subsetting module to construct a font subset file that contains selected glyphs and other data to be included in a font subset. The font subset file also holds the digitally signed root of the font authentication tree and one or more authentication values of the authentication tree that represents non-selected glyphs and data of the font that are not contained in the font subset. The font subset file is distributed to requesting clients. An authentication module at the client authenticates the font subset file received from the distributor. The authentication module reconstructs the root of the authentication tree using the selected glyphs and data in the font subset and the authentication values that represent the non-selected glyphs and data not contained in the font subset. The authentication module also produces an unsigned version of the digitally signed root using a public key of the font creator to produce an unsigned root digest. The authentication module compares the unsigned root to the reconstructed root and if and only if they match, authenticates the font subset file as originating from the distributor (or font creator) and not being subsequently altered.

27 Claims, 8 Drawing Sheets

Tree Construction Process

Font Subsetting Process

Authentication Process

SYSTEM AND METHOD FOR SECURE FONT SUBSET DISTRIBUTION

TECHNICAL FIELD

This invention relates to systems and methods for electronically distributing font subsets. More particularly, this invention relates to systems and methods for electronically distributing a font subset or a piece of media, which is extracted from a larger digitally signed font or media, in a secure manner that permits a recipient to authenticate the source of the font subset or media piece.

BACKGROUND OF THE INVENTION

Fonts are used by computers for on-screen displays and by printers for hard-copy printout. There are many different kinds of fonts available today. A "font" is a set of characters of the same typeface (e.g., Times New Roman, Arial, and Courier), style (e.g., italics), stroke weight (e.g., bold), and size (e.g., 12 point). More generally, a font defines how a set of characters appears when displayed or printed.

A font is commonly defined by a set of mathematical rules and glyph information contained in a font file. The rules define how a computer monitor or printer converts data into pixel data that is specific to turning on and off the appropriate dots, or pixels, to form the glyphs. A "glyph" is an exact shape of a character form. For instance, in a cursive (handwritten) font, the character represented by a lowercase "r" is rendered as one of two possible glyphs, depending on what character precedes it in the text.

To provide better quality glyphs, the amount of data contained in a font file continues to increase. As an example, a single font file for a Latin alphabet might consume 60 Kbytes of memory. For a Japanese character set, a single font file might be 15 to 17 Mbytes.

As the size of the font file grows, it is less convenient to supply the entire font for each application or usage of the font. For example, when a user downloads a Web page from the Internet, there is often no need for an entire font to accompany the Web page for rendering the small amount of textual content expressed on the page. Rather than downloading the entire font file (which might be large), a subset of the font file is downloaded. The subsetted font contains enough rules and glyph information to present the characters contained in the Web page.

The practice of font subsetting is well-known. A fairly recent problem that affects font subsetting concerns security. In particular, fonts that are passed over networks, and particularly public networks such as the Internet, face several security risks. One risk is that a party will copy the font file and reproduce it without permission, or make minor alterations, and then republish the font file for use in situations not intended by the font designer. This is particularly troubling for fonts protected by intellectual property. Font designers often license fonts with express conditions of when a font can, or cannot, be transported with a document or application. An unscrupulous party might attempt to tamper with the font file to change these conditions so that the font appears to legally grant permission to transfer the file in a manner not intended by the designer.

Another problem is that a font file, like other data files and code, might be infected with a virus. Still another problem is that an imposter might publish a font file of inferior quality, or one that is tainted, under the name of a reputable font designer. For these problems, it would be beneficial if the recipient of a font file could authenticate the source of the font file, and determine whether the font file has been tampered with since leaving the source.

To address these problems, font designers or publishers can digitally sign their font files by treating the file as a single stream of bytes. This technique is called a "flat file" approach. A recipient of a file can use the digital signature to verify that the font file was created by the designer and has not been subsequently altered. Unfortunately, the digital signature applies only to the original stream of bytes, and so when a font is subsetted, the signature is of no use for the subsetted font. By definition, the subsetting process necessarily converts the font file to a subsetted font file, and the digital signature is no longer valid for the subsetted font file.

One solution to the subsetting problem is to create, sign, and publish every possible subset of a font file. This solution is impractical because the number of subsets that are possible for a font is large.

Another solution is for the designer to predetermine a few common subsets, such as the most likely script/language ranges, and include signatures for each subsetted version of the font. The multiple signatures could then be stored in the font file. This technique is limited, however, in that the designer could not begin to anticipate all of the subsetting combinations that a content producer might desire. Moreover, the content producer might be unduly restricted to applying only the predetermined subsetted files.

Another possible solution is to establish a font server which, when a subset of a font is requested by a user, creates and signs the subsetted font on-the-fly and then issues the font to the user. In this scenario, the font servers would belong to font creators and would have access to private signing capabilities associated with the font creators, so that the font servers could create new signatures on-the-fly. With this technique, however, a tremendous investment in infrastructure is required. Additionally, this approach would potentially expose the signer's private key. It also requires content publishers to contact a font vendor every time a different subset is needed, which can be quite burdensome.

Accordingly, there is a need to develop a technique other than a flat file approach for subsetting a font in a manner that enables a recipient to verify the authenticity of the subsetted font.

SUMMARY OF THE INVENTION

This invention concerns a system and method for securely distributing subsetted fonts. The system includes a signing module, a subsetting module, and an authentication module. The signing and subsetting modules are resident at the font designer (or distributor), and the authentication module is resident at the client who requests and receives the subsetted font.

For a given font, the signing module constructs an authentication tree having leaves formed of glyphs, one or more intermediate levels of nodes computed as one-way functions of the glyphs, and a root computed as a one-way function of the nodes. In one implementation, the one-way function is a hash function. In addition to glyphs, other data from the font file (e.g., permissions) might also be included in the authentication tree. The signing module digitally signs the root of the authentication tree using a private key unique to the font creator or distributor.

The subsetting module subsets the font to form a font subset requested by a client. The subsetting module constructs a font subset file that contains glyphs and other data to be included in the font subset. The font subset file also holds the digitally signed root of the font authentication tree and one or more authentication values of the authentication tree that represents glyphs and data of the font that are not contained in the font subset. The font subset file is then distributed to the client.

At the client, the authentication module authenticates the font subset file received from the distributor. The authentication module reconstructs the root of the authentication tree using the glyphs and data in the font subset and the authentication values that represent glyphs and data not contained in the font subset. The authentication module also produces an unsigned root by using the public key of the font creator. The authentication module compares the unsigned root to the reconstructed root and if and only if they match, authenticates the font subset file as originating from the distributor and not being subsequently altered.

BRIEF DESCRIPTION OF THE DRAWINGS

The same reference numbers are used throughout the drawings to reference like components and features.

DETAILED DESCRIPTION OF THE PREFERRED EMBODIMENT

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (with a second edition in 1996), which is hereby incorporated by reference.

Figure 1:
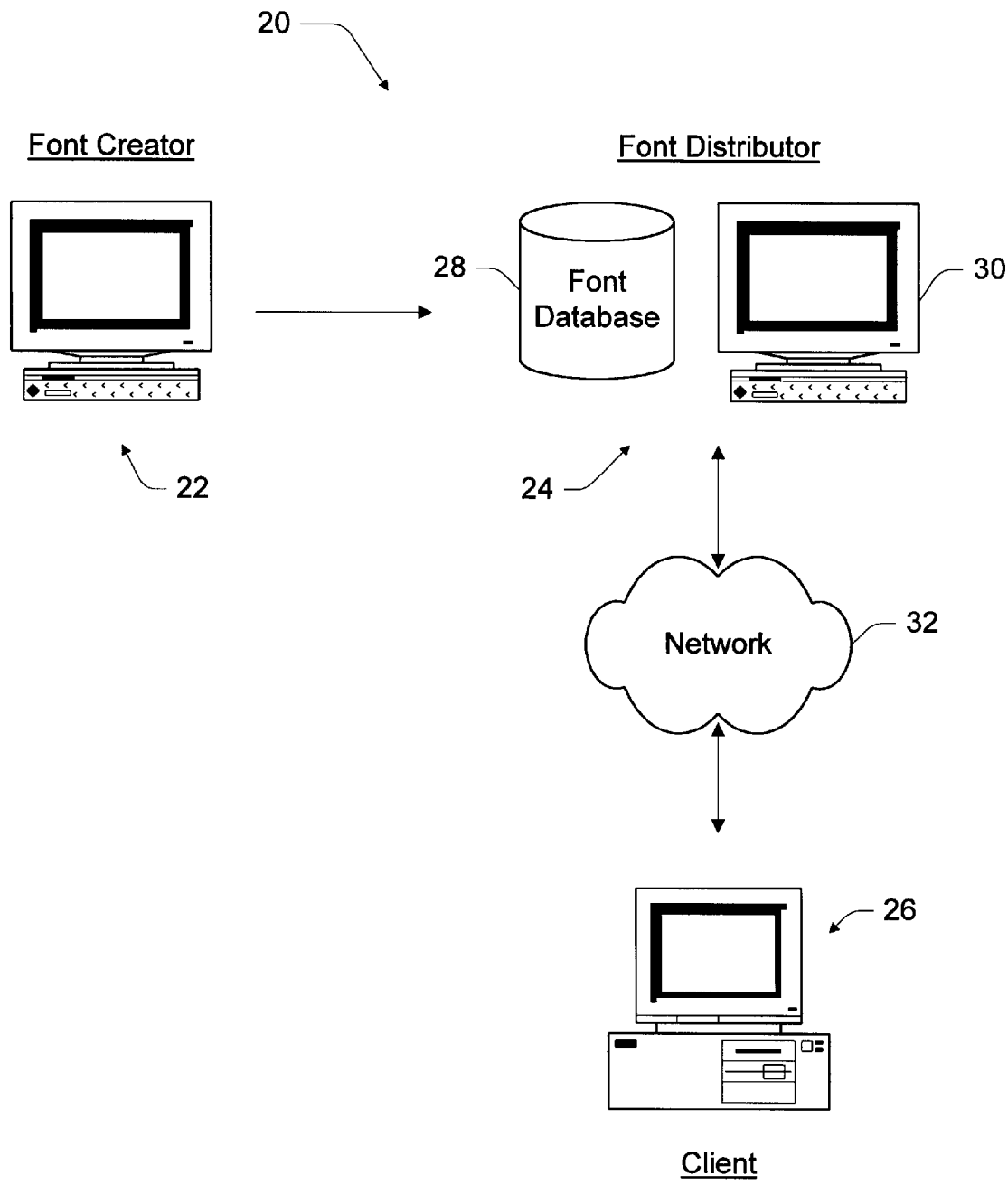
FIG. 1 is a diagrammatic illustration of a server-client architecture.

FIG. 1 shows a computer network system 20 having three participants: a font creator 22, a font distributor 24, and a client 26. The font creator 22 is illustrated with a computer server to develop digitally signed font files that can be delivered to and used by the font distributor. The font creator 22 develops a font file in such a manner that the creator's digital signature is applied to the whole font file, and also to subsets of the font file. The signed font file is sent to the distributor in a number of conventional means, such as over a network, on a diskette, CD-ROM or other computer-readable medium, and the like. One example of a font creator is a company that develops computer-generated fonts, such as Adobe.

The font distributor 24 has a font database 28 to store the digitally signed font files produced by the font creator. The font distributor 24 also has a computer 30 for serving content over a network 32 to the client 26. The distributor server 30 is configured to distribute the entire signed font file or signed subsets of the font files. The distributor server 30 is configured to subset the font file in such a manner that the client 26 can authenticate the font subset file as being created by the font creator 22 and verify that the font subset file has not been altered. Additionally, the subset file may contain information to permit the client 26 to authenticate that the font distributor 24 distributed the file. An example of a font distributor is a Web page owner who might wish to subset the font file for convenience of the client.

The network 32 can be implemented in a variety of ways. For instance, the network 32 might be a wireless network, such as satellite, radio, microwave, and so forth. The network 32 might also be a wire-based network, such as the Internet, a LAN (local area network), or a WAN (wide area network).

Figure 2:
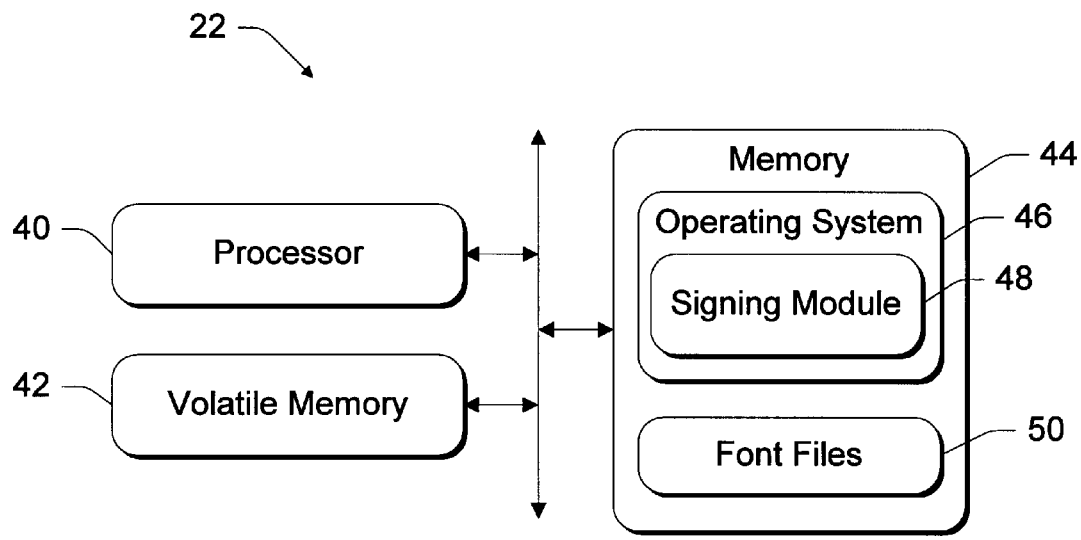
FIG. 2 is a block diagram of the server at a font creator.

FIG. 2 shows the font creator server 22 in more detail. It includes a processor 40, a volatile memory 42 (e.g., RAM), and a non-volatile memory 44 (e.g., ROM, hard disk drive, floppy disk drive, CD-ROM, etc.). The server 22 runs an operating system 46, such as the Windows NT server operating system from Microsoft Corporation or a UNIX-based operating system. The operating system 46 includes a signing module 48. This module is implemented in software and can be embodied in different forms, such as routines within the operating system, or dynamically linked libraries (DLLs), or interfaces, or the like. The signing module 48 is invoked to digitally sign the font files. More particularly, the signing module 48 is configured to construct an authentication tree for a font and to digitally sign the root of the authentication tree. The signing module 48 stores the digital signature together with the font in a font file 50. The font file 50 can then be supplied to the font distributor for publication or subsetting.

Figure 3:
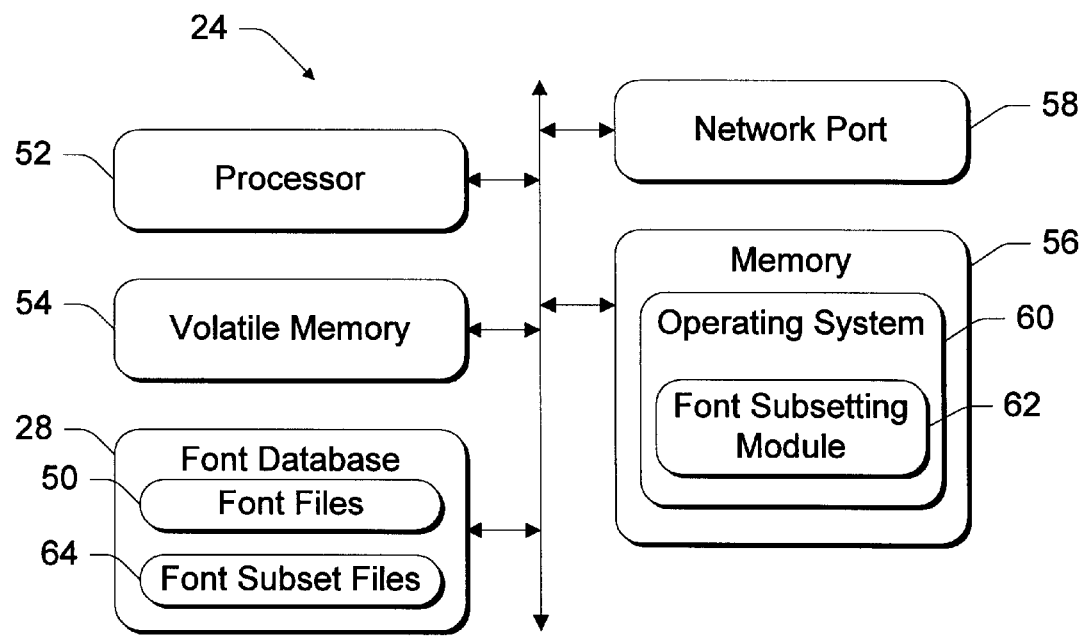
FIG. 3 is a block diagram of a server at a font distributor.

FIG. 3 shows the font distributor server 30 in more detail. It includes a processor 52, a volatile memory 54 (e.g., RAM), a non-volatile memory 56 (e.g., ROM, hard disk drive, floppy disk drive, CD-ROM, etc.), and font database 28. The server 30 also has a network port 58 that provides access to the network 32. Depending on the configuration of network 32, the network port 58 might be implemented as a wireless transmitter, a modem, an Internet connection, and the like.

The server 30 runs an operating system 60, such as the Windows NT server operating system from Microsoft Corporation or a UNIX-based operating system. The operating system 60 includes a subsetting module 62. This module is implemented in software and can be embodied in different forms, such as routines within the operating system, or dynamically linked libraries (DLLs), or interfaces, or the like.

The subsetting module 62 is invoked to subset a font to produce a font subset. The subsetting module 62 constructs, from a font file 50, a font subset file 64 containing the font subset, the digitally signed root of the authentication tree, and one or more authentication values of the authentication tree that represent portions of the font that are not contained in the font subset. The font subset file 64 may also be stored in font database 28.

In the illustrated implementation, the functions of font creation and subsetting are performed by different entities. The signing module 48 resides at a font creator to construct a font file 50 that contains the creator's signature. The subsetting module 62 resides at a distributor to construct the font subset file 64 from the font file 50. In another implementation, the functions of font creation and font subsetting are performed by the same entity. In this case, the signing module 48 and font subsetting module 62 are incorporated into the same computing unit at the entity. From the perspective of the client, the font subset file is issued by a source that may comprise one or both of the signing and subsetting modules.

Figure 4:
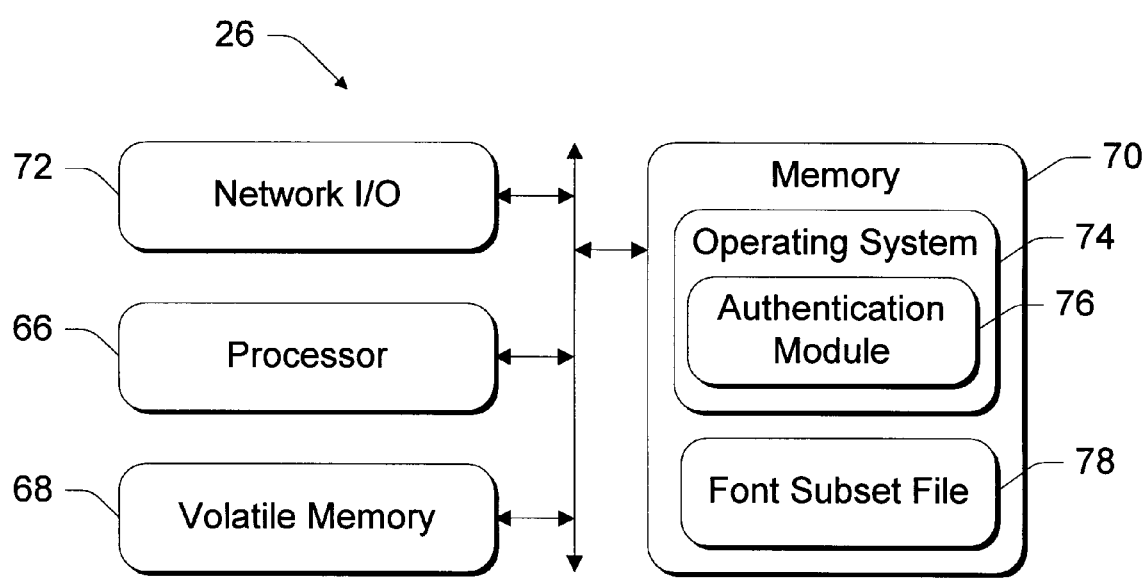
FIG. 4 is a block diagram of the client.

FIG. 4 shows the client 26 in more detail. It has a central processing unit comprising a processor 66, a volatile memory 68 (e.g., RAM), and a non-volatile memory 70 (e.g., ROM, hard disk drive, floppy disk drive, CD-ROM, etc.). The client 26 also has a network I/O (input/output) 72 for accessing the network 32. The network I/O 72 can be implemented, for example, as a wireless receiver, a modem, a network connection, or the like.

The client 26 executes an operating system 74 that supports multiple applications. The operating system 74 is preferably a multitasking operating system that allows simultaneous execution of multiple applications in a graphical windowing environment. One preferred operating system is a Windows-brand operating system sold by Microsoft Corporation, such as Windows 95, Windows NT, Windows CE, or other Windows-derivative versions. It is noted, however, that other operating systems may be employed, such as the Macintosh operating system from Apple Computer, Inc.

An authentication module 76 is shown incorporated into the operating system 74. The authentication module 76 is invoked to authenticate a font subset received from the distributor 24. When a font subset file 78 is received from the server, it is stored in memory 70. The authentication module 76 reconstructs the root of the authentication tree for the whole font using the font subset and the authentication values contained in the font subset file. The authentication module 76 authenticates the font subset if and only if the root from the font subset file matches the reconstructed root.

A method for securely distributing font subsets that can be authenticated by the client will now be described with reference to FIGS. 5–10. According to one aspect of this invention, the font file is represented as a tree structure for purposes of applying a digital signature. The font file contains glyphs and other data used to construct a set of characters. The font file is typically organized as multiple tables that contain different information, including glyph outlines, usage restrictions, metrics, and so forth. Glyph data is the largest component of the font file.

Figure 5:
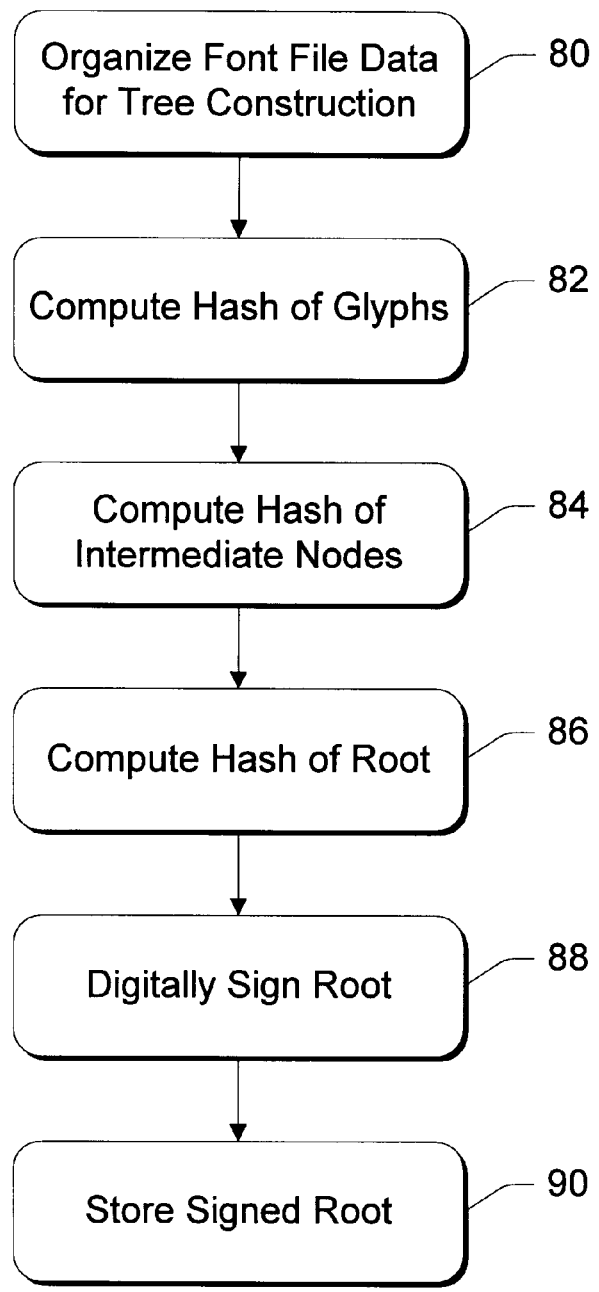
FIG. 5 is a flow diagram of a method for constructing an authentication tree for a font file.

FIG. 5 shows steps in a method for constructing an authentication tree for the font. The signing module 48 of the font creator's server operating system 46 performs the steps of FIG. 5. At step 80, the signing module 48 organizes the data from the font file as low level leaves from which an authentication tree can be constructed. For discussion purposes, the steps of FIG. 5 are described in the context of creating a portion of the authentication tree for the glyph portion of the font file, wherein individual glyphs are represented as leaves in the authentication tree.

Figure 6:
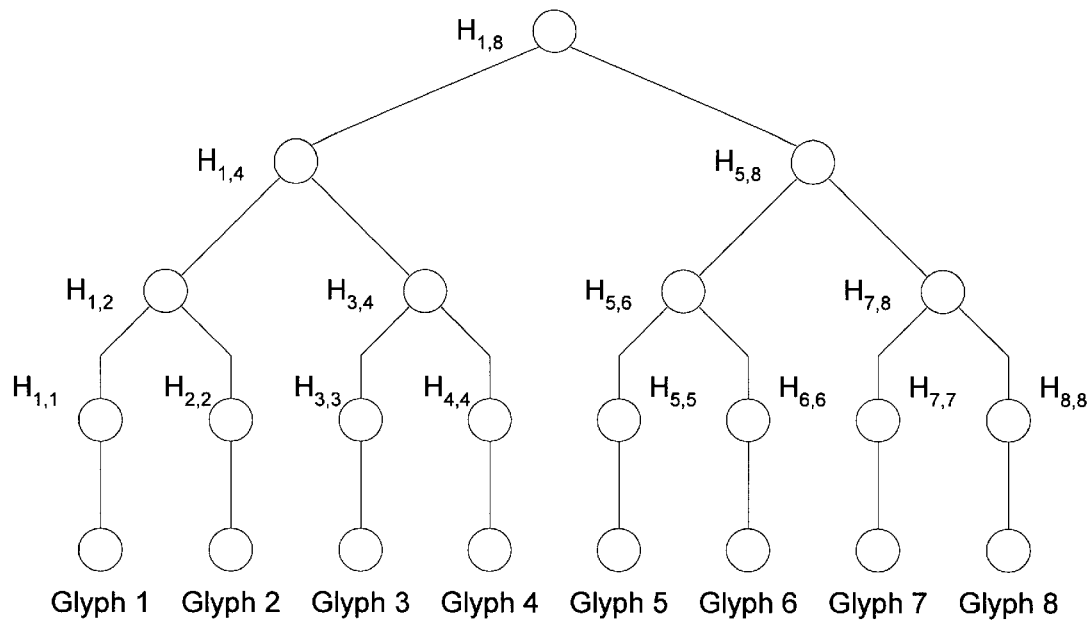
FIG. 6 is a diagrammatic illustration of an authentication tree for eight glyphs in a font file.

FIG. 6 shows a portion of the authentication tree for glyphs 1–8 of the font file. Glyphs 1–8 are arranged as the leaves at the bottom of the tree.

At step 82 in FIG. 5, the signing module 48 uses a hash function to compute a hash value for each glyph. A hash function is a one-way mathematical function that converts an input data stream into a fixed-size, often smaller, output data stream that is representative of the input data stream. Hash values do not uniquely identify the large data streams, but it is assumed to be difficult to find two data streams that produce the same hash value; hence their effect is as if they were unique identifiers. The hash function is also deterministic in that two identical definitions passed through the same hash function will result in the same hash value. One example of a suitable hash function is SHA-1 (Secure Hash Algorithm).

In FIG. 6, the hash value of glyph 1 is represented as $H_{1,1}$; the hash value of glyph 2 is represented as $H_{2,2}$; and so forth. It is noted, however, that other types of one-way functions besides hashing functions may be used to compute authentication values within the tree.

At step 84 in FIG. 5, the signing module 48 computes a hash value for each intermediate node above the leaves. A node represents the conjunction of multiple hash values from a next lowest level in the tree. In this example, the authentication tree is binary, although non-binary trees may also be used. Each node branches to two nodes beneath it, thus representing $2^{level}$ leaves, where "level" is the number of levels from the node to the leaves. For example, each node at one level above the leaves represents two leaves (i.e., $2^1$ leaves); each node at the next level up represents four leaf nodes (i.e., $2^2$ leaves); and so forth.

Consider the node that combines glyphs 1 and 2. The hash value of this node, $H_{1,2}$, is represented as follows:

$$H_{1,2} = F(H_{1,1}, H_{1,2})$$

where the function F is a one-way function that takes two values as input. In one implementation, the function F concatenates its inputs and applies a hash function (e.g., SHA-1). The node at the next level up represents four glyphs 1–4. The hash value of this node, $H_{1,4}$, is represented as follows:

$$H_{1,4} = F(H_{1,2}, H_{3,4}) = F(F(H_{1,1}, H_{2,2}, F(H_{3,3}, H_{4,4}))$$

The authentication tree has a root node at the very top. This root represents all of the underlying leaves. The root of the FIG. 6 tree portion represents all eight glyphs 1–8. At step 86 in FIG. 5, the signing module computes a hash value for the root of the tree. In this example, the hash value for the root is as follows:

$$H_{1,8} = F(H_{1,4}, H_{5,8})$$

In general, if there are n glyphs, then $H_{1,n}$ is the hash value representing all the glyphs.

Assuming there are only eight glyphs in the font file, the glyph branch of the authentication tree is now complete. As noted above, the glyph portion is only one component, albeit the predominate one, of the font file. Other tables are also found in the font file, such as a metrics table. The signing module 48 separately hashes each table and applies F to these hash values to compute a hash for the root, which represents the entire font file. Note that the hash values for these other tables might be computed using a flat file approach (if their contents does not change when the font file is subsetted), the technique of the authentication tree (if their data is organized similar to that of the glyph data), or a combination of these techniques.

Figure 7:
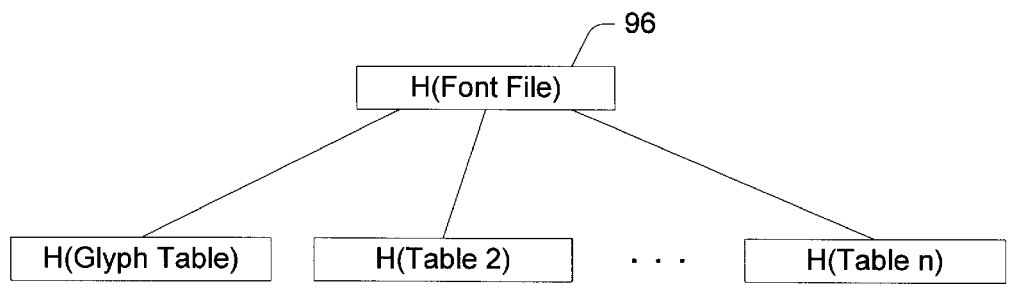
FIG. 7 is a diagrammatic illustration of a primary root portion of the authentication tree for the font file.

FIG. 7 shows a root 96 for the authentication tree of the entire font file. This root is formed from concatenating the hash values of all roots of the sub-trees for all tables 1-n of the font file, including the glyph table, and computing a hash value as follows:

$$H(\text{Font File}) = F(H(\text{Glyph Table}), H(\text{Table 1}), \ldots, H(\text{Table n}))$$

where F is allowed to have multiple values as input.

At step 88 in FIG. 5, the signing module 48 digitally signs the root using a digital signature unique to the font designer or distributor. One technique for forming this digital signature is to sign the hash value $H_{1,8}$ of the root using a private signing key from an asymmetric public/private key pair that is unique to the designer or distributor. The public/private keys form the foundation of public key cryptography systems. The keys are based upon a mathematical relationship in which one key cannot be calculated (at least in any reasonable amount of time) from the other key. The public key is distributed to other parties and the holder maintains the private key in confidence. Public key cryptography is well-known. An example of one well-known asymmetric cipher is the RSA cryptographic algorithm named for the creators Rivest, Shamir, and Adleman.

At step 90 in FIG. 5, the signing module 48 stores the signed root as part of the font file in the font database.

One technique for constructing authentication trees is described in U.S. Pat. No. 4,309,569, which issued Jan. 5, 1982 in the name of Merkle. This patent is incorporated by reference.

A binary tree has been described for convenience. It is noted that the authentication tree can be organized in many different forms. The tree can be made flatter, whereby each node branches to more than two underlying nodes. Moreover, some optimization might be used to group glyphs or other data in a manner that would reduce the size of the tree or the number of authentication values needed to reconstruct the root for typical subsets.

Figure 8:
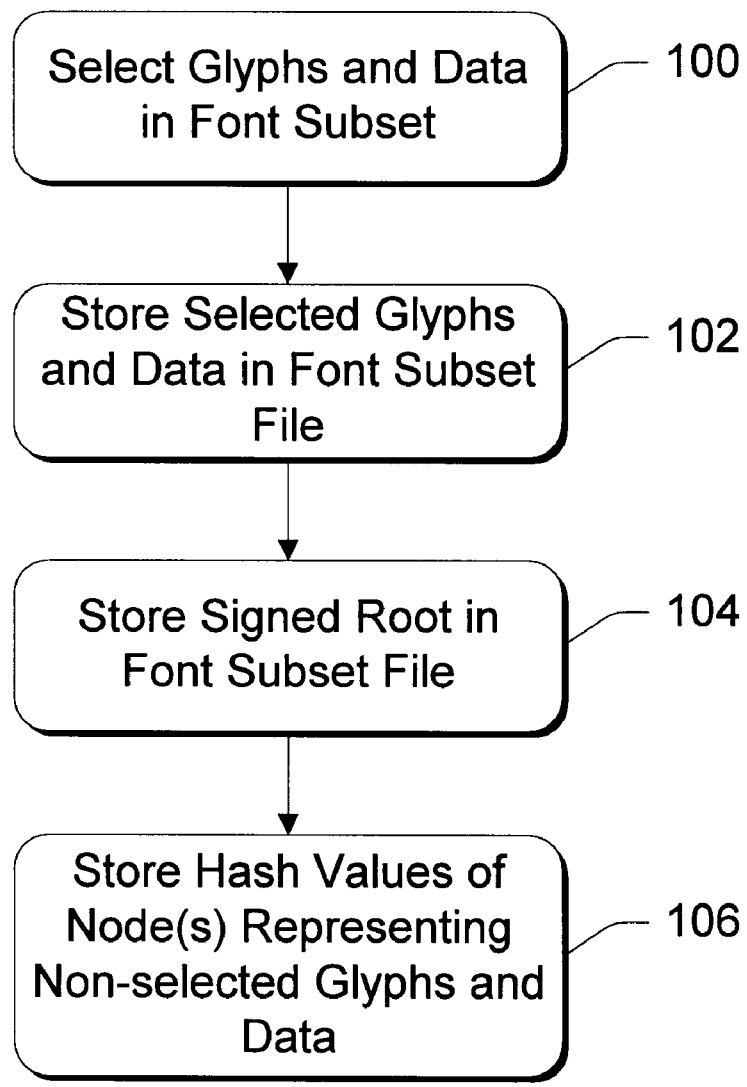
FIG. 8 is a flow diagram of a method for subsetting a font file.

FIG. 8 shows steps in a method for subsetting a font file that contains the digitally signed root. The subsetting module 62 of the font distributor's server operating system 60 performs the steps. At step 100, the subsetting module 62 selects the glyphs and data to be included in the font subset. This data is obtained from the various tables in the font file. The subsetting module 62 stores the selected glyphs and data in a font subset file (step 102 in FIG. 8). The subsetting module 62 also stores the digitally signed root in the font subset file (step 104 in FIG. 8).

The subsetting module 62 further includes, as part of the font subset file, the authentication values of the authentication tree that represents portions of the font that are not contained in the font subset. In our example, the subsetting module 62 stores the hash values of the non-selected glyphs and data (step 106 in FIG. 8). To improve space efficiency, a single hash value representing a group of contiguous missing glyphs or data can be included in the font subset file, rather than the hash value for each missing glyph or datum.

Figure 9:
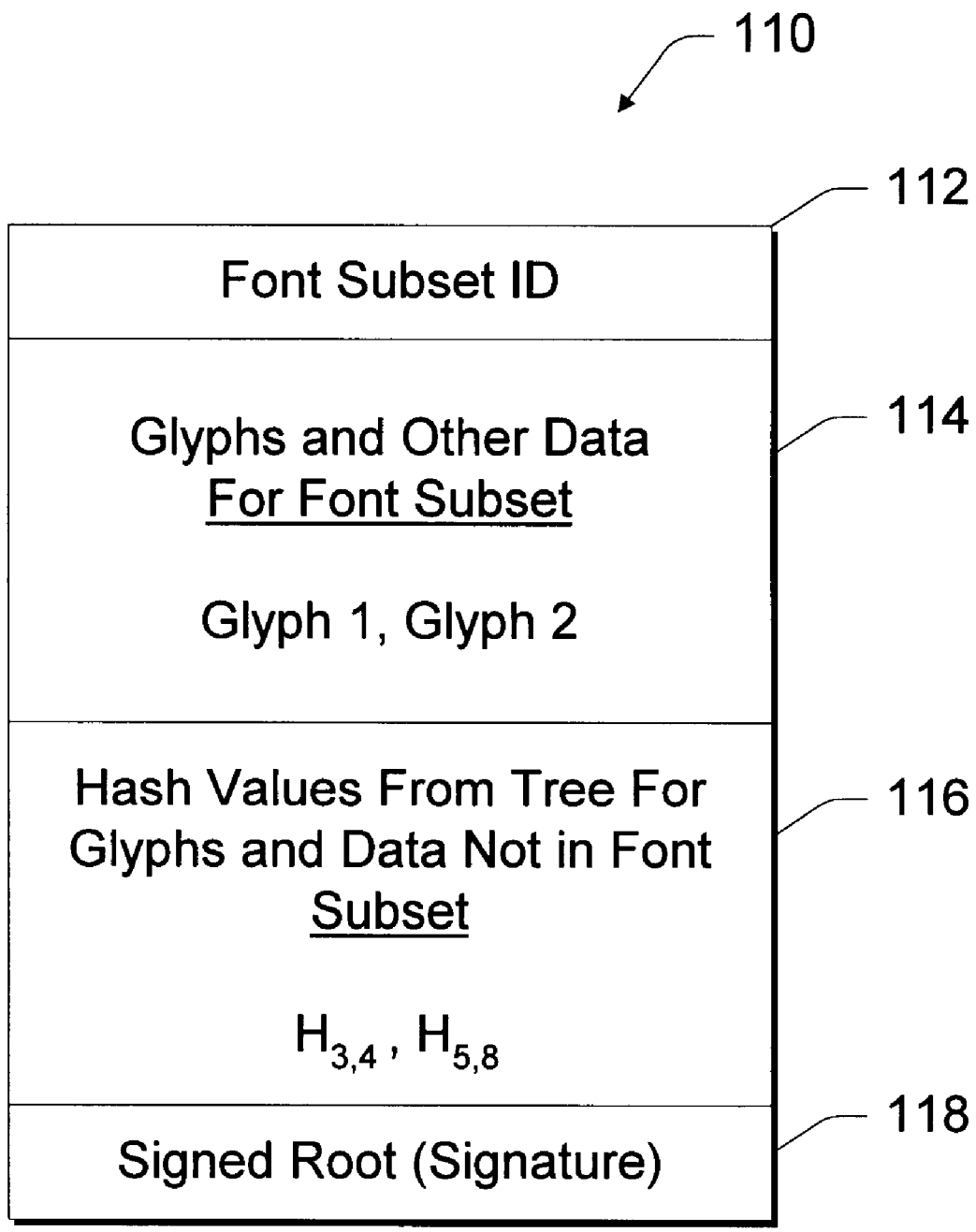
FIG. 9 is a diagrammatic illustration of a data structure for a subsetted font file.

As an example, suppose the font subset of the glyph tree in FIG. 6 calls only for glyphs 1 and 2. The subsetting module 62 constructs a font subset file that contains the subsetted glyphs 1 and 2, the signed root, and the hash values for non-selected glyphs 3–8. Rather than storing each individual hash value $H_{8,8}$, however, the non-selected glyphs 3 and 4 can be represented by the node hash value $H_{3,4}$ and the non-selected glyphs 5–8 can be represented by the node hash value $H_{5,8}$. FIG. 9 shows a data structure 110 for the font subset file. It has a subset identification field 112 that contains enough information to determine which glyphs are present in the font subset and a content field 114 that contains the selected glyphs and data for the font subset. In this example, the content field 114 holds the selected glyphs 1 and 2. The content field 114 contains glyph-specific information, such as instructions for how to render a specific glyph. The field also contains font-wide information, such as the name of the font, its publisher, permissions, and general information for how to render glyphs of the font. The font subset data structure 110 also includes an authentication field 116 with one or more authentication values from the font authentication tree that represents all remaining glyphs and data from the font that are not part of the font subset. In this example, the authentication field 116 might hold the hash value representing glyphs 3 and 4 (i.e., the hash value $H_{3,4}$) and the hash value representing glyphs 5–8 (i.e., the hash value $H_{5,8}$). A signature field 118 is included in the font subset data structure 110 to hold the digitally signed root of the font authentication tree. Once constructed, the font subset file is stored in the memory of the server, and/or downloaded to the client.

It is noted that the subsetting module 62 can further subset an already subsetted font file, using similar techniques, to compute the appropriate values for the authentication field 116. That is, given a subset S of present glyphs, authentication values for non-present glyphs, and a subset S' of S, one can compute the authentication values corresponding to the glyphs missing from S'. These values are the same values that would have been computed by the subsetter if it had been given as input the original font file and S'.

Figure 10:
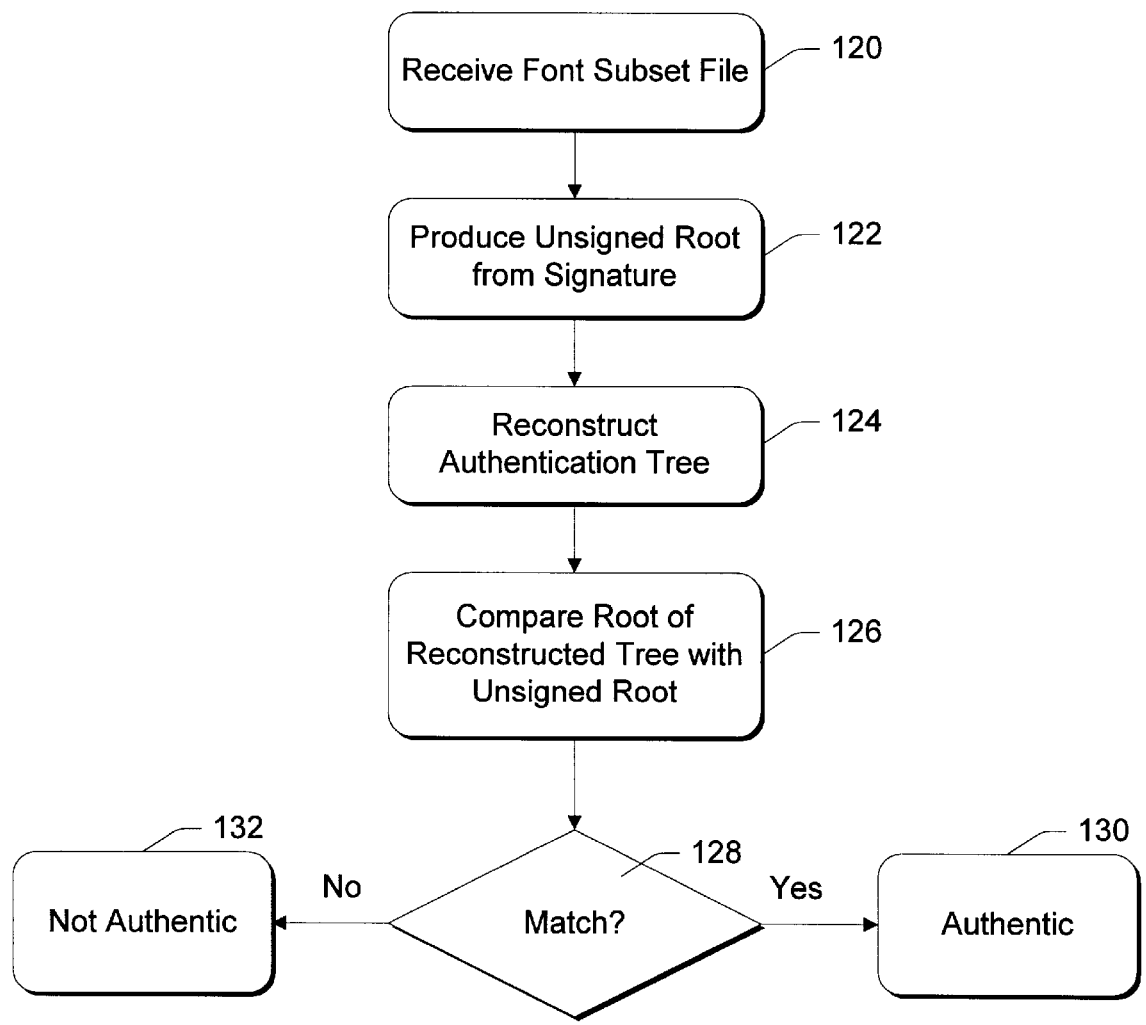
FIG. 10 is a flow diagram of a method for authenticating a subsetted font file.

FIG. 10 shows steps in a method for authenticating a font subset file at the client. The authentication module 76 of the client operating system 74 performs the steps. At step 120, the client computer receives the font subset file from the server, stores it in memory, and makes it available to the authentication module 76. The authentication module 76 produces the unsigned root by applying the server's public key to the digitally signed root contained in the signature field 118 (step 122 in FIG. 10).

At step 124 in FIG. 10, the authentication module 76 uses the data glyphs from content field 114 and the authentication values from authentication field 116 to reconstruct the authentication tree for the whole font file. Starting with the glyphs in content field 114 (i.e., glyphs 1 and 2), the authentication module 76 computes the hash values $H_{1,1}$, and $H_{2,2}$, then computes the hash value $H_{1,2}$ using F, and so forth.

When the portions of the tree containing non-selected glyphs are needed, the authentication module 76 uses the hash values recomputed from the glyph data together with the hash values representing the non-selected glyphs. For example, to produce the hash value $H_{1,4}$, the authentication module 76 applies F to the recomputed value $H_{1,2}$ and the value $H_{3,4}$ received in authentication field. Then, to compute the root hash digest $H_{1,8}$, the authentication module 76 applies F to the recomputed value $H_{1,4}$ and the value $H_{5,8}$ received in authentication field. At this point, the authentication module has recreated the hash digest for the root of the glyph portion of the authentication tree. Any other information contained in the font subset file pertaining to other tables is then used to compute the hash digest of the root for the entire authentication tree.

At step 126 in FIG. 10, the authentication module 76 compares the reconstructed root with the unsigned root. If the two values match (i.e., the "yes" branch from step 128), the authentication module 76 deems the font subset file authentic (step 130). Conversely, if the two values fail to match (indicating that the file was not signed by the alleged source or has been tampered with), the authentication module 76 informs the operating system or user that the font subset file is not authentic (step 132). If the font subset is not authentic, the operating system can make a determination whether to use the font subset file. The operating system may still decide to use the font subset file, but with the knowledge that it may risk utilizing a potentially tainted or infected file.

The system and method of securely subsetting a font file is advantageous in that it allows the distributor to supply any combination of font subsets, each of which can be easily verified as belonging to the same source, without having to digitally sign each subsetted font. Another advantage is that the technique accommodates all font information in addition to glyphs, such as intellectual property permissions, so that a font file can be subsetted in essentially any permutation of glyphs, permissions, and other font data.

Another, less preferred, technique to solving the problems addressed in the Background section is to digitally sign every glyph or other piece of data in the font. When the font is subsetted, the requested glyphs and data, along with their respective signatures, are placed into the subsetted font file. This technique is less preferred, however, because it would dramatically increase the size of the subsetted font file. Glyph data typically comprise 100 to 300 bytes each. By comparison, a digital signature might be 100 bytes long. Adding a 100-byte signature to each glyph significantly enlarges the original font file. For subsetted fonts, the preferred technique requires one signature and (typically) $\log_2 n$ authentication values, where n is the number of glyphs in the original font file and the size of an authentication value is typically 20 bytes. A typical range for n is 600 (for Pan-European fonts) to 16000 (for Eastern fonts). Thus, the total number of bytes needed for a typical subset is at most $100+((\log_2 16000)*20)$, or about 380. By comparison, the less preferred technique requires 100 bytes for each present glyph. So, when there are at least four present glyphs in the subset, the space requirement of the less preferred technique is greater.

This invention has been described in the context of subsetting font files. It is noted that aspects of this invention may be extended to other types of subsetted media, including video, audio, and graphics. In the case of video, for example, the video is segmented into discrete media segments (such as one second segments) and the signing module constructs an authentication tree from the media segments. Then, when a client requests a video clip (such as a 20-second clip), the server provides a subsetted media file containing the media segments in the video clip and authentication values representing the media segments not contained within the media subset. The client reconstructs the authentication tree from this information and verifies the authenticity of the video clip.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for supplying authenticated font subsets, comprising the following steps:
   constructing an authentication tree for a font;
   subsetting the font to form a font subset; and
   distributing the font subset together with at least one authentication value of the authentication tree that represents portions of the font that are not contained in the font subset.

2. A method as recited in claim 1 wherein the constructing step comprises the following steps:
   constructing one or more intermediate authentication trees for tables in a font file; and
   constructing the authentication tree from the intermediate authentication trees.

3. A method as recited in claim 1 further comprising the following steps:
   receiving the font subset and the authentication value(s); and
   authenticating the font subset using the authentication value(s).

4. A method as recited in claim 1 further comprising the following steps:
   digitally signing a root of the authentication tree;
   storing the font subset, the authentication value(s), and the digitally signed root as a font subset data file.

5. A data structure stored on a computer-readable medium constructed as a result of the following steps:
   constructing an authentication tree for a font;
   digitally signing a root of the authentication tree;
   subsetting the font to form a font subset;
   storing the font subset, at least one authentication value of the authentication tree that represents portions of the font that are not contained in the font subset, and the digitally signed root as a font subset data file.

6. A computer-readable medium having computer executable instructions that, when executed on a processor, perform the following steps:
   constructing an authentication tree for a font;
   subsetting the font to form a font subset; and
   distributing the font subset together with at least one authentication value of the authentication tree that represents portions of the font that are not contained in the font subset.

7. A method comprising the following steps:
   receiving a font subset that is subsetted from a font file, the font file being represented by an authentication tree whose root is digitally signed by a source;
   receiving at least one authentication value from the authentication tree that represents portions of the font that are not contained in the font subset;
   receiving the digitally signed root;
   reconstructing the authentication tree from the font subset and the authentication value(s); and
   authenticating the font subset based upon the reconstructed authentication tree and the digitally signed root.

8. A method as recited in claim 7, wherein the authenticating step comprises the following steps:
   producing an unsigned root from the signed root;
   deriving a reconstructed root from the reconstructed authentication tree;
   comparing the reconstructed root with the unsigned root; and
   accepting the font subset as authentic if the reconstructed root matches the unsigned root.

9. A computer-readable medium having computer executable instructions for performing the steps in the method as recited in claim 7.

10. A method for supplying a font comprising the following steps:
    constructing a hash tree for the font, the hash tree having leaves formed of glyphs and data that define the font, the hash tree also having a root;
    digitally signing the root of the hash tree to authenticate the font as belonging to a source;
    subsetting the font by selecting one or more of the glyphs and data to form a font subset;
    storing the font subset, one or more hash values that represent all remaining glyphs and data that are not part of the selected font subset, and the digitally signed root as a font subset file;

electronically transmitting the font subset file;

receiving the font subset file;

producing an unsigned root of the hash tree from the signed root contained in the font subset file;

reconstructing the hash tree from the font subset and the one or more hash values contained in the font subset file to derive a reconstructed root; and authenticating the font subset by comparing the reconstructed root with the unsigned root derived from the signed root.

11. In a system for electronically delivering media wherein the media is segmented into multiple individual media segments and the segments are used to construct an authentication tree that is digitally signed by a source to authenticate the media as belonging to the source, a method comprising the following steps:

subsetting the media to form a media subset containing one or more of the media segments; and sending the media subset and at least one authentication value of the authentication tree that represents the media segments not contained within the media subset so that a recipient can authenticate the media subset as belonging to the source.

12. A method as recited in claim 11, further comprising the following steps:

receiving the media subset and the authentication value(s) at the recipient; and authenticating the media subset using the authentication value(s).

13. A method as recited in claim 11, further comprising the following steps:

subsetting the media subset to form a second media subset containing one or more of the media segments in the media subset; and sending the second media subset and at least one authentication value of the authentication tree that represents the media segments not contained within the second media subset so that a recipient can authenticate the second media subset as belonging to the source.

14. In a system for electronically delivering media wherein the media is segmented into multiple individual media segments and the segments are used to construct an authentication tree that is digitally signed by a source to authenticate the media as belonging to the source, a computer-readable medium having computer executable instructions that, when executed on a processor, perform the following steps:

subsetting the media to form a media subset containing one or more of the media segments; and sending the media subset and at least one authentication value of the authentication tree that represents the media segments not contained within the media subset so that a recipient can authenticate the media subset as belonging to the source.

15. A system for supplying authenticated font subsets, comprising:

a signing module to construct an authentication tree for a font and digitally signing a root of the authentication tree;

a subsetting module to subset the font to form a font subset and constructing a font subset file containing the font subset, the digitally signed root, and at least one authentication value of the authentication tree that represents portions of the font that are not contained in the font subset; and an authentication module to authenticate the font subset by reconstructing the root of the authentication tree using the font subset and the authentication value(s) from the font subset file, producing an unsigned root from the digitally signed root of the font subset file, and checking the unsigned root against the reconstructed root.

16. A system as recited in claim 15, wherein the signing module resides at a font creator, the subsetting module resides at a font distributor separate from the font creator, and the authentication module resides at a recipient.

17. A system as recited in claim 15, wherein the signing module and the subsetting module reside at a single source and the authentication module resides at a recipient.

18. A system as recited in claim 15, further comprising:

a source computer residing at a font creator, the signing module being configured as a software component executing on the source computer;

a distributor computer residing at a font distributor, the subsetting module being configured as a software component executing on the distributor computer; and a recipient computer residing at a recipient, the authentication module being configured as a software component executing on the recipient computer.

19. A computer program embodied on a computer-readable medium for creating a font file, the font file including a set of glyphs, comprising:

a code segment to instruct a computer to construct an authentication tree having leaves formed of glyphs, one or more intermediate levels of nodes computed as one-way functions of the glyphs, and a root computed as a one-way function of the nodes; and a code segment to instruct a computer to digitally sign the root of the authentication tree.

20. A computer program as cited in claim 19, wherein the font file also contains other data in addition to the glyphs, further comprising a code segment to instruct a computer to construct an authentication tree having leaves formed of glyphs and the other data, one or more intermediate levels of nodes computed as one-way functions of the glyphs and the other data, and a root computed as a one-way function of the nodes.

21. A computer operating system embodied on a computer-readable medium having code segments for creating a font file, the font file including a set of glyphs, the computer operating system comprising:

a code segment to instruct a computer to construct an authentication tree having leaves formed of glyphs, one or more intermediate levels of nodes computed as one-way functions of the glyphs, and a root computed as a one-way function of the nodes; and a code segment to instruct a computer to digitally sign the root of the authentication tree.

22. A computer program embodied on a computer-readable medium for subsetting a font file, the font file including a set of glyphs and a digitally signed root of an authentication tree that is derived from the glyphs, comprising:

a code segment to instruct a computer to create a font subset file that includes part of the glyphs in the font file and excludes remaining ones of the glyphs in the font file; and a code segment to instruct a computer to add to the font subset file the digitally signed root and one or more nodes from the authentication tree that represent the remaining glyphs.

23. A computer operating system embodied on a computer-readable medium having code segments for subsetting a font file, the font file including a set of glyphs and a digitally signed root of an authentication tree that is derived from the glyphs, the computer operating system comprising:

a code segment to instruct a computer to create a font subset file that includes part of the glyphs in the font file and excludes remaining ones of the glyphs in the font file; and a code segment to instruct a computer to add to the font subset file the digitally signed root and one or more nodes from the authentication tree that represent the remaining glyphs.

24. A computer program embodied on a computer-readable medium for handling a font subset file that is subsetted from a font file, wherein the font file is represented by an authentication tree having leaves formed of glyphs, one or more intermediate levels of nodes computed as one-way functions of the glyphs, and a root computed as a one-way function of the nodes, and wherein the font subset file contains selected glyphs, the root of the authentication tree, and one or more of the nodes from the authentication tree that represent non-selected glyphs, comprising:

a code segment to instruct a computer to reconstruct the root of the authentication tree from the selected glyphs and the nodes contained in the font subset file; and a code segment to instruct a computer to authenticate the font subset file based on the reconstructed root and the root contained in the font subset file.

25. A computer program as recited in claim 24, wherein the root is digitally signed and the font subset file contains the digitally signed root, comprising:

a code segment to instruct a computer to produce an unsigned root from the digitally signed root contained in the font subset file;

a code segment to instruct a computer to compare the unsigned root from the font subset file to the reconstructed root; and a code segment to instruct a computer to authenticate the font subset file if the unsigned root matches the reconstructed root.

26. A computer operating system embodied on a computer-readable medium incorporating the computer program as recited in claim 24.

27. A data structure embodied on a computer-readable medium, comprising:

an identification field containing an identification of a font subset that is subsetted from a font;

a content field containing selected glyphs and data that define the font subset;

an authentication field containing one or more authentication values from an authentication tree for the font, the authentication values representing non-selected glyphs and data from the font that are not part of the font subset; and a signature field containing a digitally signed root value computed from a root of the authentication tree.

* * * * *